(12) United States Patent
Xu et al.

(10) Patent No.: US 12,381,813 B2
(45) Date of Patent: Aug. 5, 2025

(54) LOCATION-AWARENESS-BASED NETWORK INTERMEDIATE DEVICE

(71) Applicant: PEKING UNIVERSITY, Beijing (CN)

(72) Inventors: Chenren Xu, Beijing (CN); Yunzhe Ni, Beijing (CN); Feng Qian, Shanghai (CN)

(73) Assignee: Peking University, Beijing (CN)

( * ) Notice: Subject to any disclaimer, the term of this patent is extended or adjusted under 35 U.S.C. 154(b) by 595 days.

(21) Appl. No.: 17/754,919

(22) PCT Filed: Oct. 23, 2020

(86) PCT No.: PCT/CN2020/123084
§ 371 (c)(1),
(2) Date: Apr. 15, 2022

(87) PCT Pub. No.: WO2021/078231
PCT Pub. Date: Apr. 29, 2021

(65) Prior Publication Data
US 2023/0131149 A1    Apr. 27, 2023

(30) Foreign Application Priority Data

Oct. 24, 2019 (CN) .......................... 201911015829.8
Oct. 24, 2019 (CN) .......................... 201911015891.7
Oct. 24, 2019 (CN) .......................... 201911020062.8

(51) Int. Cl.
*H04L 45/24*     (2022.01)
*H04L 12/46*     (2006.01)
*H04L 41/14*     (2022.01)
*H04L 41/147*    (2022.01)
*H04L 43/0811*   (2022.01)
*H04L 43/0829*   (2022.01)
(Continued)

(52) U.S. Cl.
CPC .............. *H04L 45/24* (2013.01); *H04L 12/46* (2013.01); *H04L 41/147* (2013.01);
(Continued)

(58) Field of Classification Search
None
See application file for complete search history.

(56) References Cited

U.S. PATENT DOCUMENTS 10,044,604 B1 *   8/2018  Burns .................... H04L 69/16
2014/0341023 A1  11/2014  Kim et al.
(Continued)

FOREIGN PATENT DOCUMENTS

CN         102791045 A       11/2012
CN         107396396 A       11/2017
(Continued)

OTHER PUBLICATIONS

Svennebring, U.S. Appl. No. 62/884,647, filed Aug. 8, 2019 (Year: 2019).*
(Continued)

*Primary Examiner* — Jay L Vogel
(74) *Attorney, Agent, or Firm* — Michael Ye; Kalos Athena Wang PLLC

(57) ABSTRACT

The present invention relates to a location-awareness-based network intermediate device, at least comprising a scheduling module, which is configured to fuse short-term historical data about short-term and/or real-time network performance and location-awareness-based multi-day network performance data, so as to generate context data for predicting network performance, and acquire a deterministic connectivity mode in a mobile network environment based on the context data so as to enhance performance of end-to-end transmission. With this configuration, the concept of location-awareness-based packet scheduling can be translated into an actual system for end-to-end multi-path transmission. From the location-awareness-based long-term multi-day network performance data, the deterministic connectivity pattern of trains in the high-speed mobile network environment can be acquired, and after being fused with the
(Continued)

short-term historical data observed in a short time period, a good basis for calibration of prediction of network performance can be provided, thereby enhancing robustness of network connectivity in a high-speed movement scene.

4 Claims, 3 Drawing Sheets

(51) Int. Cl.
　　*H04L 43/0864*　　(2022.01)
　　*H04L 43/0888*　　(2022.01)
　　*H04L 43/20*　　(2022.01)
　　*H04L 67/562*　　(2022.01)
　　*H04W 40/18*　　(2009.01)
　　*H04W 40/20*　　(2009.01)

(52) U.S. Cl.
　　CPC ........ *H04L 43/0811* (2013.01); *H04L 67/562* (2022.05); *H04W 40/18* (2013.01); *H04W 40/20* (2013.01); *H04L 41/145* (2013.01); *H04L 43/0829* (2013.01); *H04L 43/0864* (2013.01); *H04L 43/0888* (2013.01); *H04L 43/20* (2022.05)

(56) References Cited

U.S. PATENT DOCUMENTS

| | | | |
|---|---|---|---|
| 2016/0028615 A1* | 1/2016 | Lee | H04L 45/123 |
| | | | 370/237 |
| 2017/0353378 A1* | 12/2017 | Chen | H04L 45/08 |
| 2019/0319868 A1* | 10/2019 | Svennebring | H04L 43/0882 |
| 2020/0259746 A1* | 8/2020 | Thubert | H04L 47/2483 |
| 2021/0258941 A1* | 8/2021 | Chou | H04W 72/542 |
| 2022/0303331 A1* | 9/2022 | Svennebring | H04N 21/44209 |
| 2022/0353652 A1* | 11/2022 | Fechtel | H04W 4/46 |

FOREIGN PATENT DOCUMENTS

| | | |
|---|---|---|
| CN | 109218186 A | 1/2019 |
| CN | 109347738 | 2/2019 |
| CN | 109586973 A | 4/2019 |
| CN | 109716818 A | 5/2019 |
| CN | 110621040 A | 12/2019 |
| CN | 110635988 A | 12/2019 |
| CN | 110730248 A | 1/2020 |
| WO | WO-2021026509 A1 * | 2/2021 ........... H04L 41/147 |

OTHER PUBLICATIONS

International Search Report. PCT/CN2020/123084, mailed Jan. 29, 2021.
Official Communication. CN 201911015829.8, mailed Jun. 10, 2020.
Official Communication. CN 201911015891.7, mailed May 6, 2020.
Official Communication. CN 201911020062.8, mailed May 25, 2020.
Yunzhe NI, "Poster: A Multipath Transport Multihoming Mobile Relay Architecture for High Speed Rails Networking" Peking University, Beijing China.

* cited by examiner

| Reality \ Decision | Success | Failure | Blackout |
|---|---|---|---|
| Success ($P_I$) | 0 | 1 | 2 |
| Failure ($P_{II}$) | 1 | 0 | 2 |
| Blackout ($P_{III}$) | 1 | 1 | 0 |
| Decision risk | $P_{II} + P_{III}$ | $P_I + P_{III}$ | $2(P_I + P_{II})$ |
Fig. 2
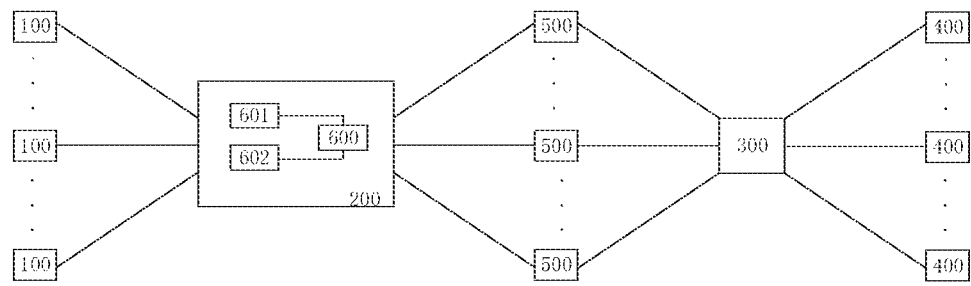
Fig. 3
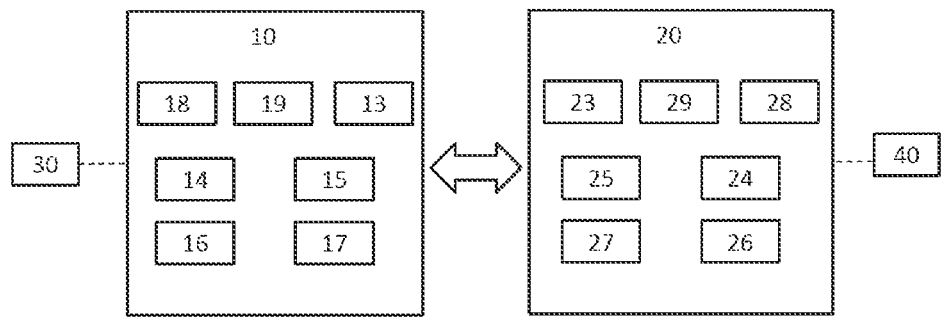
Fig. 4
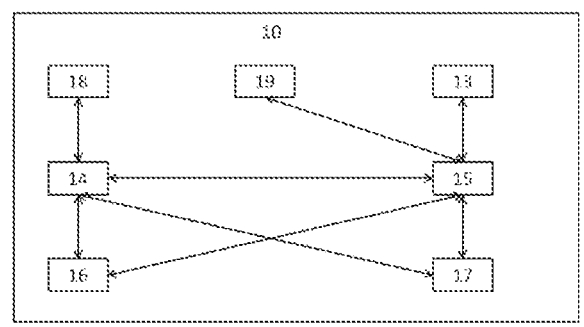
Fig. 5

LOCATION-AWARENESS-BASED NETWORK INTERMEDIATE DEVICE

BACKGROUND OF THE INVENTION

1. Technical Field

The present invention relates to the technical field of communication, and more particularly to a location-awareness-based network intermediate device.

2. Description of Related Art

While multi-path transmission technologies are effective in enhancing transmission reliability, increasing network invulnerability, and improving throughput performance, they somehow make resource management more challenging.

For example, as mentioned in Literature [1] (Wang Fenghua. Research of Multi-Path Transmission Management Technology [D]. Beijing University of Posts and Telecommunications, 2014), the conventional, simple polling scheduling algorithm reflecting that the overall throughput of links existing in multi-path transmission decreases as the number of paths increases ignores the problem of congestion caused by out-of-order packet delivery of data at the receiving end as a result of path difference and packet loss. The prior-art research thus built a model for predicting when packets arrive at the receiving end, and scheduled the packets in a smart way according to the prediction, so as to realize in-order packet delivery as much as possible. The prior-art research also investigated in two retransmission mechanisms by analyzing probabilities of two types of retransmissions caused by packet loss, times required by the retransmissions, and the resulting overheads at the receiving end. For increasing the probability of packet arrival and reducing overheads at the receiving end, a forward error correction (FEC) redundancy mechanism was introduced. However, FEC brings about some extra redundancy overheads. Packet scheduling may be achieved by abstracting FEC-based redundancy scheduling management into a constrained optimization problem and finding out the optimal solution of this problem. Nevertheless, the high protocol overheads caused by FEC increase costs of packet scheduling and affect performance of end-to-end transmission. Particularly, in a dynamically varying network environment, once the limited buffer area is fully occupied by the queue of data packets to be retransmitted, transmission of data packets at the transmitting end will stop and will not resume until the buffer area has vacant space again. This can degrade the overall performance of the entire link.

For example, China Patent Publication No. CN109347738A discloses a method for optimizing scheduling of multi-path transmission in a vehicle heterogeneous network. The known method comprises: estimating the number of out-of-order data packets and the required size of the buffer area; if the required buffer area as predicted is greater than the available buffer area, activating Q learning, identifying inferior-performance sub-streams using a path selection algorithm that predicts available bandwidth based on throughput, and stopping using these sub-streams for transmission; once the topological structure such changes that the available receiving buffer area exceeds 2.5 times of the required size of the buffer area, resuming all of the previously stopped sub-streams to transmit data. The method of the prior-art patent is for addressing the differences among paths in a heterogeneous network in terms of delay, bandwidth, load, packet loss rate, etc. However, the Round-Robin algorithm, as a default in the multi-path transmission protocol (MPTCP), when using these path transmission resources can lead to out-of-order delivery of data packets, thereby causing congestion in the receiving buffer area. Despite the fact that the prior-art patent implements scheduling based on throughput predicted using Q learning, for in-vehicle applications, car movement can place the network in a highly dynamic environment where the network changes between status of disconnection and connection persistently. Such status changes can not only wrongly stop some available paths, but also wrongly predict the required size of the buffer area, thereby significantly decreasing throughput of the network.

For example, Literature [2] (Zhu Danyang. Research of Multi-Path Transmission Technology for Mobile Internet of Vehicles [D]. 2018) notes the problem of interruption of data transmission caused by mobility of in-vehicle nodes and dynamic variation of network topology and the problem of low transmission performance due to poor use of network resources due to the quality differences among paths in a heterogeneous wireless network and the traditional data distribution mechanism, and proposes a MPTCP solution based on packet loss differentiation. The known solution applies a queuing theory model to data distribution for multi-path data transmission to assess the transmission quality of each sub-path, and dynamically distributes data according to the quality of each sub-path, thereby enhancing transmission speed. The known solution also uses a reliability option probe to identify link blackout, and monitor path reliability. When the link becomes unreliable, data are shifted to other paths for stable transmission. This not only reduces unnecessary retransmission, but also speeds up data escalation, so as to enhance transmission performance. The real-time monitoring method employed in the prior research uses a sub-type identifier provided by MPTCP to set a reliability option, such as an OPT_LR option. When the transmitting end has not received confirmation from the receiving end after the maximum round trip delay as measured in the link, it is determined that the path has been black out and is no more useful for data transmission. Thereby, real-time monitoring adaptive to a highly varying network environment about a rapidly moving vehicle can be achieved. However, such a method excessively depends on the network measurement technologies, leaving its reliability highly dependent on precision of the used network measurement technology. Besides, in a high-speed movement environment, such as high-speed rail having a speed up to 350 km/h, where the mobile communication network frequently performs path switching or gets interrupted, wrong determination and retransmission tend to happen. For example, if the OPT_LR option has not reached the receiving end dur to transmission interruption, but at the next moment the train moving at a very high speed comes into coverage of a nearby base station and the connection resumes, it is likely that the system wrongly determines the current network situation and starts retransmission instantly. Even if use of the OPT_LR option helps accurately and reliably monitor the current network situation, the dynamic and varying nature of a mobile network can have data packets shifted among paths frequently and rapidly, thereby significantly degrading performance of multi-path transmission. Meanwhile, one point missed by all of the prior-art patent and researches recited above is that since a train or a car usually has a predetermined route of travel, by means of modeling and prediction for wayside connection, frequent and rapid shift of data packets in a link can be prevented. To sum up, it would be desired to fuse multiscale information based on the unique, dynamically varying nature of network connectivity that repeatedly gets disconnected and then resume, to comprehensively predict network conditions in a location-awareness manner, so as to make packet scheduling more robust against uncertainty in terms of bandwidth and connection.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In view of the shortcomings of the prior art, the present invention provides to a location-awareness-based network intermediate device, at least comprising a scheduling module, which is configured to fuse short-term historical data about short-term and/or real-time network performance and location-awareness-based multi-day network performance data, so as to generate context data for predicting network performance, and acquire a deterministic connectivity mode in a mobile network environment based on the context data so as to enhance performance of end-to-end transmission. With the configuration, by considering both the offline location-awareness-based network performance information and the online signal information (e.g., switching indicating signals and distributed wireless spectrum resources), great robustness against abnormal location input can be obtained, thereby being agile in the event of network interruption and always maintaining maximum bandwidth usage. Location awareness may be at least for predicting performance of a mobile communication network of a moving article at different locations by sensing dynamic variations of the network according to physical locations of the moving article and network locations thereof. In particular, the prediction may be made to the throughput of the mobile communication network, or the round trip delay time of a path therein, for example. Location-awareness-based multi-day network performance data may be in the form of a database constructed based on location awareness. For example, cellular signals may be used to construct a database for location-awareness-based prediction of network performance, for storing location-awareness-based prediction data of network performance of corresponding moving articles (multiple units, trains, automobiles, etc.) generated in multiple days of operation. The multi-day network performance data are stored in the database, and are offline data generated using prediction results of several times a day for multiple days. The short-term historical data may be network performance parameters, like throughput and RTT, measured in a short time period, such as in the past few seconds, or may alternatively be real-time network performance parameters as reflected by signals.

According to a preferred mode, the network intermediate device is deployed in a communication path between a plurality of clients and a plurality of servers to relay communication data between the clients and the servers. The network intermediate device further comprises transceiver modules. The scheduling module is configured to map data of the clients or the servers received by the transceiver modules to at least two communication paths accessed by the transceiver modules based on context data, so as to implement multi-path transmission between the clients and the servers.

According to a preferred mode, the scheduling module is configured to distribute the data received by transceiver modules to a first path processing the data while bypassing a kernel protocol stack and to a second path processing the data while passing through the kernel protocol stack, and construct a multi-user multi-path transmission framework at the user space level by mapping the data processed by the first path to at least two mutually independent communication paths.

According to a preferred mode, the scheduling module analyzes and classifies the received data based on the transceiver modules, thereby distributing the data of an editable, specific data type to the first path. The scheduling module classifies the received data through: determining whether a frame structure of the received data accords with a frame structure of the specific data type; and determining whether the received data are data directly connected to a target client or a target server.

According to a preferred mode, the network intermediate device is further provided with at least one data-acquiring module. The scheduling module uses at least one data-acquiring module to acquire first data related to end-to-end aggregation performance in every communication path, second data related to connections of different clients or connections and transmission of the servers, and third data related to network performance.

According to a preferred mode, the scheduling module acquires location-awareness-based multi-day network performance data and short-term historical data through the first data, the second data, and the third data of the data-acquiring module. The scheduling module fuses the location-awareness-based multi-day network performance data and the short-term historical data through: unifying the location-awareness-based multi-day network performance data and short-term historical data into an estimate of a network performance indicator in a complementary manner.

According to a preferred mode, the scheduling module is configured to: sensing disconnections/connections of different standard networks based on the estimate of the network performance indicator; predicting probabilities of switching results among the different standard networks based on the disconnections/connections of different standard networks; and generating risk switching results based on the predicted probabilities of the different switching results. The switching results include Success, Failure, and Blackout.

According to a preferred mode, the scheduling module is configured to acquire the risk switching results through: assigning different penalty values to wrong predictions about Success, Failure, and Blackout; constructing a risk decision table based on the penalty values and the predicted probabilities of Success, Failure, and Blackout; generating risk switching results based on the minimal risk value in the risk decision table.

According to a preferred mode, when the risk switching results indicate that connection of at least one standard network is Failure and/or Blackout, the scheduling module retransmits, across the communication path, the copy of the data transmitted through the connection of the standard network, thereby reducing out-of-order delivery delay and packet loss.

The present invention further provides a location-awareness-based network intermediate device, to be deployed at a first terminal and/or a second terminal. The network intermediate device performs fusion assessment on data packet information from different sources based on long-term historical data and short-term historical data, and performing information fusion on the data packet information fitting in the fusion threshold range. The long-term historical data are historical network performance data for at least one day that store location awareness. The short-term historical data are network performance data of the first terminal and/or the second terminal monitored in a short-term time threshold.

The present invention further provides a location-awareness-based network intermediate device, to be deployed at a first terminal and/or a second terminal. The network intermediate device comprises at least one processor. The processor is configured to perform relevance merging on data packets received by the network intermediate device according to preset data stream recombining rules so as to obtain the data, and transmit the merged data to terminals in data connection thereto through communication interfaces. The preset data stream recombining rules are: performing fusion assessment on network performance data information from different sources based on long-term historical data and short-term historical data, and performing information fusion on the data information fitting in a fusion threshold range. The long-term historical data are historical network performance data for at least one day that store location awareness. The short-term historical data are network performance data of the first terminal and/or the second terminal monitored in a short-term time threshold.

According to a preferred mode, the fusion assessment is achieved by means of a minimum variance unbiased estimate of a weighted average of plural data sources.

According to a preferred mode, the network intermediate device comprises at least one processor, a memory, and at least two communication interfaces, wherein the processor executes operations of at least one computer-readable instruction stored in the memory. The operations include: having the processor, from a user space, receive and transmit data packets of any source IP through original sockets, and in separate network namespace, extract and transmit the data packets by means of multi-path parallel transmission, so as to be parallel with an original transmission path of original data information between the first terminal and the second terminal, so that the first terminal and the second terminal are uninformed of existence of the network intermediate device.

According to a preferred mode, the processor at least comprises a first information sniffing module, a first path management module, a first distribution strategy module, and a first scheduling module. The first path management module is for splitting original data information received by the first information sniffing module from the user space through an original socket interface into plural data packets, and performing multi-path parallel transmission in data packet transmission paths determined by the first scheduling module based on a scheduling algorithm. The first scheduling module determines the transmission paths of the data packet and communication interfaces at two ends of the paths based on contextual features of context data sources, at least one said scheduling algorithm, and a distribution strategy provided by the first distribution strategy module.

According to a preferred mode, the contextual features at least include: a path context, related to end-to-end aggregation performance of data streams between a first communication module and a second communication module; a connection context, related to enumeration of factors affecting QoE optimization at a level of connections, and a third-party context, namely any context coming from internal or external library or a terminal application module other than the path context and the connection context.

The present invention further provides a multi-path transmission relay method, comprising deploying a first data relay processing module in a routing path for communication between a plurality of clients and a plurality of servers. The method further comprises: establishing multi-path connections between the first data relay processing module and plural clients or servers that are capable of multi-path transmission or a second data relay processing module that has communication sessions with plural servers. The first data relay processing module and the second data relay module are configured to predict network performance by fusing location-awareness-based multi-day network performance data and short-term historical data, and map the data received from the clients or servers to at least two mutually independent communication paths based on the predicted network performance, thereby implementing multi-path transmission between the clients and the servers.

According to a preferred mode, the first data relay processing module and the second data relay module distribute the data received from the plural clients or servers to first path processing the data while bypassing the kernel protocol stack processing and to a second path processing the data while passing through the kernel protocol stack. The first data relay processing module and the second data relay module construct a multi-user multi-path transmission framework at the user space level by mapping the data processed by the first path to at least two mutually independent communication paths.

BRIEF DESCRIPTION OF THE DRAWINGS

FIG. 2 is a preferred risk decision table of the present invention;

FIG. 3 is a schematic drawing of preferred deployment of the network intermediate device of the present invention;

FIG. 4 a schematic modular diagram of the network intermediate device according to another preferred mode of the present invention;

FIG. 5 is a schematic structural diagram of the first communication module of the present invention;

Figure 1:
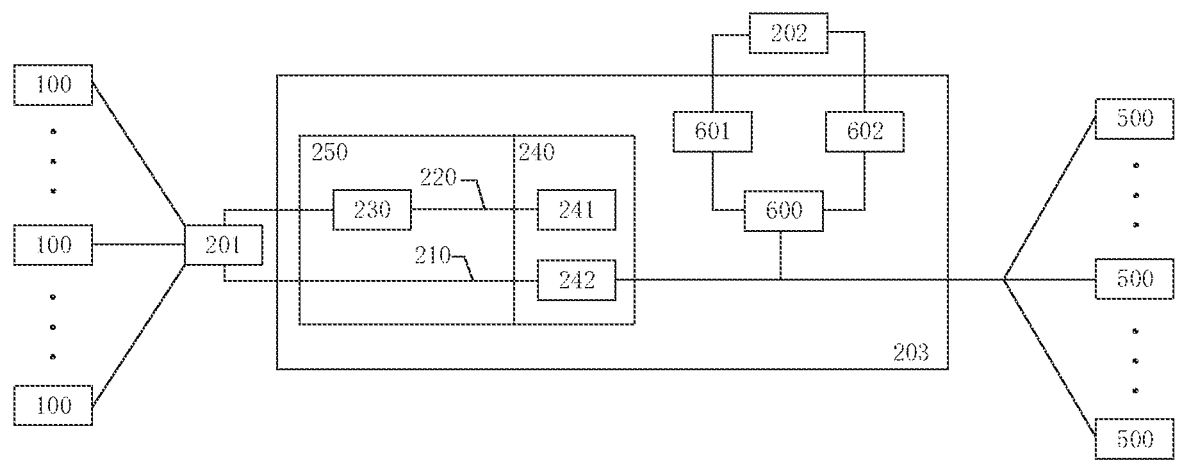
FIG. 1 is a schematic modular diagram of the network intermediate device according to one preferred mode of the present invention.

| List of reference number | |
|---|---|
| 100: Client | 200: First data relay processing module |
| 300: Second data relay processing module | 400: Server |
| 500: Communication path | 201: Transceiver module |
| 202: Data-acquiring module | 203: Scheduling module |
| 210: First path | 220: Second path |
| 230: Kernel protocol stack | 240: User space |

-continued

| List of reference number | |
|---|---|
| 250: Kernel space | 241: Standard socket |
| 242: Original socket | 600: Context data |
| 601: Multi-day network performance data | 602: Short-term historical data |
| $P_I$: Probabilities of Success | $P_{II}$: Probabilities of Failure |
| $P_{III}$: Probabilities of Blackout | 110: Network adapter |
| 120: First virtual network adapter | 130: Second virtual network adapter |
| 10: First communication module | 20: Second communication module |
| 30: First terminal | 40: Second terminal |
| 50: Transmission layer interface | 60: Kernel protocol stack |
| 70: Processor | 11: First information sniffing module |
| 12: First path management module | 13: First real-time analysis module |
| 14: First distributing module | 15: First scheduling module |
| 16: First multiplexing and demultiplexing module | 17: First TCP socket module |
| 18: First APP resource module | 19: First network performance database |
| 21: Second information sniffing module | 22: Second path management module |
| 23: Second real-time analysis module | 24: Second distributing module |
| 25: Second scheduling module | 26: Second multiplexing and demultiplexing module |
| 27: Second TCP socket module | 28: Second APP resources module |
| 29: Second network performance database | 31: Original socket interface |
| 41: Context data source | |

DETAILED DESCRIPTION OF THE INVENTION

The following description is to be read with reference to the accompanying drawings. First, some terms used in the description of the present invention are defined.

Proxy Server: this term may be referred to a network proxy, which provides a special network service, and allows one network terminal to have no-direct connection with another network terminal through this service. Bandwidth Aggregation: multi-path transmission is aimed at doubling the available bandwidth of a network by means of parallel transmission over plural available paths. With effective bandwidth aggregation so achieved, multihoming devices can get improved network performance. Packet: a packet corresponds to the network layer of TCP/IP, and refers to the data unit of communication transmission based on the TCP/IP protocol, also known as a data packet. In the context of scheduling, a packet refers to the granularity by which the scheduling strategy forwards data. User Space: the term refers to the space in which a user program operates. Kernel Space: the term refers to the operation space of the kernel of an operating system. Context: a context is in brief an environmental parameter. Environmental parameters are parameters about network performance and for scheduling user streams, such as transmission times, bytes, etc. Network Namespace: Linux kernel provides namespaces. A namespace packages global system resources into an abstract, and the abstract is only bound to the progress in the namespace, thereby providing isolation of resources. Network namespaces provide all the progresses in namespaces with brand new network stacks, including network interfaces, routing tables, etc. Cell-ID: the code is for determining a user location, namely the call number of a terminal is reported through a wireless network (estimated according to the base station of services). A location service platform can translate a cell number into longitude and latitude coordinates. Reference Signal Receiving Power (RSRP): the term represents the linear average of power levels received by resource elements of a reference signal carried by a frequency bandwidth, and is one of the key parameters representing wireless signal strength in an LTE network as well as one of the measurement requirements for the physical layer. It is an average of signal power levels received at all resource particles of a reference signal carried by some symbol. It is equivalent to RSCP (Received Signal Code Power) for WCDMA in terms of use and regulation. Signal Parameters Trace: the term refers to a sequence diagram of parameters related to cellular signals.

Embodiment 1

In view of the shortcomings of the prior art, the present invention provides a multi-path transmission network intermediate device, to be deployed in a communication path between a plurality of clients 100 and a plurality of servers 400, so as to relay the communication data between clients 100 and servers 400. The network intermediate device comprises a transceiver module 201 and a scheduling module 203. Preferably, the transceiver module 201 is for receiving data of a plurality of clients 100 or servers 400. Preferably, the transceiver module 201 at least comprises a wired/wireless gateway, a signal receiver, and a signal transmitter, and is capable of receiving wired or wireless signals. Preferably, the transceiver module 201 further comprises a WLAN interface, a Wi-Fi interface, an Ethernet RH45 interface, etc. Preferably, the transceiver module 201 further comprises a Bluetooth module, a ZigBee module, etc. Preferably, the transceiver module 201 further comprises a baseband processing circuit equipped with a corresponding SIM card slot, or comprises a SIM card slot and a corresponding baseband processing chip. The SIM card slot is connected to a baseband processing chip through a peripheral logic circuit installed outside the SIM card slot. Preferably, the baseband processing circuit or the baseband processing chip can modulate and demodulate signals of various mobile communication technologies, such as global system for mobile communication (GSM), wideband code division multiple access (WCDMA), code division multiple access (CDMA), time division-synchronous code division multiple access (TD-SCDMA), the 3rd-generation mobile communication (3G), long term evolution (LTE), LTE-Advanced of the 4th-generation mobile communication (4G) standard, system architecture evolution (SAE) of 4G standard, and the 5th-generation mobile communication (5G). Preferably, the transceiver module 201 has a dedicated set of a radio frequency circuit and a modulating-demodulating module for the mobile communication network of every corresponding operator, so that signals from the operators can work simultaneously. Preferably, for saving costs, the transceiver module 201 may at least comprise two transmitting circuits and two modulating-demodulating modules, so as to be able to use two different standard networks.

Preferably, the scheduling module 203 can process data received by the transceiver module 201, and distribute the data to different communication paths 500. The scheduling module 203 can be central processing unit (CPU), general-purpose processor, digital signal processor (DSP), application specific integrated circuit (ASIC), field programmable gate array (FPGA) or other programmable logic devices, transistor logic devices, hardware components or any combination thereof. Preferably, the scheduling module 203 carries an operating system, such as Linux system. Preferably, the different communication paths 500 are for different standard networks accessed by the transceiver module 201 in the network intermediate device.

Preferably, the network intermediate device is further provided with at least one data-acquiring module 202. The data-acquiring module 202 can acquire at least three types of data, including first data related to end-to-end aggregation performance in every communication path 500, for example. The first data at least include the per-second throughput in the communication path 500. Preferably, the data-acquiring module 202 may further acquire second data related to connection of different clients 100 or connection and transmission of every server 400. The second data may include factors affecting QoE optimization, such as the type and transmission percentage of data streams under transmission. For example, the second data may be used in priority sorting of HTML files, so as to mitigate queue head congestion in key paths. As a further example, the second data may be used in monitoring times and fields of activities transmitted at the (sub) stream level and the user level, respectively, thereby achieving co-stream scheduling and priority/fairness-based bandwidth assurance. Preferably, the data-acquiring module 202 may further acquire third data related to network performance. Preferably, the third data may not only provide real-time switching signals and PHY layer bandwidth to acquire short-term historical data 602, but also provide their cell IDs and signal strength to the scheduling module 203, so as to perform prediction of expected network performance based on location awareness. Preferably, the short-term historical data 602 may be network performance parameters such as throughput and RTT detected in a short-term period, such as in the past few seconds, or may alternatively be real-time network performance parameters of signals.

Preferably, the foregoing prediction of expected network performance based on location awareness may be at least about sensing dynamic variations of a network through physical locations of a moving article and network locations, thereby predicting performance of a mobile communication network of the moving article at different locations, such as predicting the throughput, the round trip delay time, etc. of the mobile communication network. It is known that trains, multiple units, high-speed rails and buses usually travel along predetermined routes. Therefore, by modeling and predicting wayside connection, it is possible to prevent the link for data transmission from rapid switching. However, high-speed movement makes network connectivity less predictable than in low-speed movement scene. The present embodiment is explained using an experiment conducted in the "Fuxing" train traveling along the Beijing-Shanghai high-speed railway in China for example, as this train represents a high-speed rail network environment created in the fastest train (up to 350 km/h). According to the experiment, it is found that switching among cellular cells may happen at different times, and may the network may be connected to different cellular cells at the same time. Additionally, in the experiment, cellular signals in a low-speed movement scene may be used as an indicator for prediction of network performance. One the other hand, the relevance between cellular signal strength and network performance is weak in a high-speed movement environment. Particularly, when RSRP of a cellular signal is greater than −100 dBm, throughputs of different operators have similar medians yet each change in a wide range. In an example, with a weak signal (smaller than or equal to −110 dBm) having a throughput of 5 Mbps, when RSRP is −80 dBm, its throughput is 100 kbps. Therefore, in a high-speed movement scene, prediction of network performance is of great importance. Since the in-situ strategy makes tracing the cell ID different from tracing train mobility, and the network performance is rather random when the signal strength is below 30 dB range, prediction of network performance has to be done on the basis of location awareness, so as to prevent the network from being switched or interrupted in a high-speed movement scene. For example, prediction of network performance based on location awareness may be achieved by using cellular signals to construct a database for prediction of network performance based on location awareness, so as transmit network-related parameters to the scheduling module 203, which can then ensure the throughput of the network based on frequent network interruption or network switching, thereby enhancing performance of end-to-end transmission in a high-speed movement scene.

Preferably, the scheduling module 203 is configured to fuse location-awareness-based multi-day network performance data 601 and short-term historical data 602 to generate context data 600 about prediction of network performance. Preferably, the multi-day network performance data 601 may be generates in a location aware manner. The location aware manner may involve using cellular signals to construct a database for prediction of network performance based on location awareness to store location-awareness-based prediction data of network performance of corresponding moving articles (multiple units, trains, automobiles, etc.) generated in multiple days of operation. The multi-day network performance data 601 are store in the database and are offline data generated using prediction results of several times a day for multiple days. The short-term historical data 602 may be network performance parameters, like throughput and RTT, measured in a short time period, such as in the past few seconds, or may alternatively be real-time network performance parameters as reflected by signals. Preferably, the scheduling module 203 maps, based on the context data 600, data of plural clients 100 or servers 400 received by the transceiver modules 201 to at least two mutually independent communication paths 500 accessed by the transceiver module 201, thereby implementing multi-path transmission between the clients 100 and the servers 400. With the foregoing arrangement, the concept of location-awareness-based packet scheduling can be translated into an actual system for end-to-end multi-path transmission. From the location-awareness-based long-term multi-day network performance data 601, the deterministic connectivity pattern of the corresponding train in the corresponding high-speed mobile network environment can be acquired, and after being fused with the short-term historical data 602 observed in a short time period, such as the throughput, RTT, etc. so as to mitigate variations of conditions of the high-speed mobile network in the multi-day network performance data 601 over time due to TCP congestion, low signal strength (partially due to the weather), and high load, a good basis for calibration of prediction of network performance can be provided, thereby enhancing robustness of network connectivity in a high-speed movement environment.

Preferably, the multi-day network performance data 601 may be used to construct a corresponding database which is used by the scheduling module 203 through lookup. Preferably, the present embodiment employs a reliable location performance calibration solution based on cellular information. The cellular information has robustness against GPS signal blackout and train delay. Preferably, the database may be a "Key-Value" distributed storage database in which values can be taken according to keys, and therefore has excellent concurrent reading and writing abilities. Preferably, the key-related issue of the database is how to design effective keys according the cellular information for the purpose of network performance lookup. The straw man solution is conventionally used in the prior art. The straw man solution is about directly mapping instantaneous cellular information (i.e., the cell ID and RSRP value) to TCP performance. Such a solution may cause two problems in terms of key. First, since a wireless channel continuously undergoes fast fading, RSRP traces generated at the same location on different dates can be significantly different. Secondary, in addition to duplicate cell IDs in a route, a mobile device may be switched to different cellular cells at the same physical location every day, so mapping between the cell IDs and the physical locations of a train is uncertain.

Preferably, the database may be constructed from the first data, the second data, and the third data of the data-acquiring module 202 through: 1. Processing the acquired first data and/or the second data and/or the third data to construct signal parameter data; 2. using the signal parameter data to construct performance data to be used for prediction of network performance; and 3. construct switching data based on disconnection/connection pattern among networks. With the foregoing arrangement, by setting some cell IDs in keys, different values can be taken based on the corresponding data type, thereby preventing the problem of no match between keys and values as described previously.

Preferably, the multi-day network performance data 601 for prediction of performance of plural networks based on location awareness can be constructed from performance data and switching data. Preferably, the database transmits the performance data and the switching data to the scheduling module 203. Preferably, the database at least includes the signal parameter data, the performance data, and the switching data. Therein, the keys of the signal parameter data and the switching data are set as cell IDs. The corresponding value of the switching data are data related to prediction of Failure or Blackout. The values of the signal parameter data are the related RSRP identifiers. Preferably, the keys of the performance data are RSRP identifiers. Preferably, the corresponding values of the performance data are network performance parameters, such as the throughput, RTT, the packet loss rate, etc. Preferably, the switching data provide the scheduling module 203 with information related to network switching.

According a preferred mode, the signal parameter data are constructed through:
    a. Isolating different formats of signal parameter traces based on the acquired first data and/or the second data and/or the third data from each other, thereby breaking the dependency between physical locations and network locations. This brings about some beneficial effects: since they are in the same route, the signal switching strategies and results of the same operator at different time points may be significantly different. Thus, search in the database is designed to be based on independent matching of each operator and dependency between physical locations and network locations is broken, thereby enhancing efficiency of database analysis and search.
    b. Dividing the signal parameter trace of each corresponding cell ID in the acquired first data and/or the second data and/or the third data into several trace entries according to the first period and overlapping windows. Preferably, the signal parameter trace may be a RSRP trace. The RSRP trace is divided into several segments in the unit of the first period. The overlapping window refers to the overlapped part between each two segments. With this configuration, in a short period of time, signal traces are used as a part of keys for searching for historical network performance. Although it is unlikely that duplicate persists throughout the entire RSRP trace of every cellular cell, the local tendency may remain following physical planning. Therefore, all RSRP traces are divided into several trace entries and then packeted according to the cell IDs. By collecting data traces for several days, most situations can be covered by means of enumeration.

According to a preferred mode, the performance data for prediction of network performance are constructed through:
    A. Performing best matching based on distance measurement between the trace entries for at least one day stored in the signal parameter data and associated with cell IDs and the newly input trace entries associated with cell IDs, so as to generate the performance data. Preferably, the distance measurement may be a Euclidean distance. Through this design, the similarity between two trace entries can measured using the Euclidean distance, and two networks having similar trace entries should have similar performance.
    B. With matching performed on the trace entries, returning the performance data in the second period before matching of the trace entries. Preferably, since the cellular data receive prediction of TCP performance with time delay, proactive search has to be used to make prediction of network performance more reliable. The time delay at least includes cellular chip delay up to 200 ms, up-link delay, and the execution time of the predictive matching algorithm. Preferably, the second period may be the sum of these time delays, such as 5 seconds.

According to a preferred mode, when at least one of the minimal values of the cell ID-related distance measurement is greater than a first threshold, the database feeds a confidence level back to the scheduling module 203 as a reference, thereby quantifying reliability of the performance data. Preferably, the confidence level is calculated through Ni/K, where Ni is the count of minimal distances of top K smaller than an experience threshold. Preferably, since the input RSRP segments may be very different from the performance parameters obtained through the foregoing matching, or the value of the Euclidean distance is relatively large to cause low similarity, the predicted network performance is unreliable. Therefore, in addition to the predicted network performance, the confidence level is also returned to the scheduling module 203 as a reference, thereby quantifying reliability of the search result.

Preferably, the switching data at least include first switching data indicating Success, second switching data representing Failure, and third switching data denoting Blackout that are determined according to the disconnection/connection times that lead to switching among plural networks. Preferably, in a mobile scene, switching of a mobile communication network can be any of three cases: 1. Success: all switching control signals are received successfully, and the network disconnection/connection times ae usually smaller than 100 ms, which is insensible to TCP; 2. Failure: the switching request from UE is transmitted to (and recorded in) the base station, but in the opposite direction, the switching command from the base station to the UE is lost. The median of the disconnection/connection times is 1 second, and the 95th percentile of the disconnections/connections time can be up to 5 seconds; and 3. Blackout: this generally happens when user equipment is outside cellular coverage suddenly, such as entering a tunnel or being in an area where there is no base station deployed. The median of the disconnection/connection time is 3 seconds, and the 90th percentile of the disconnections/connections time is 10 seconds. Different from Failure, the user equipment is unable to see any switching request log during Blackout.

Preferably, the switching data at least may feed the second switching data representing prediction of Failure and the third switching data representing prediction of switching Blackout back to the scheduling module 203. With this configuration, in addition to highly dynamic variation of the network, disconnections/connections caused by Failure and Blackout are also a critical factor responsible for degraded network performance. Thus, in a high-speed movement scene, by providing the scheduling module 203 with the relevant switching information, the scheduling module 203 can be prevented from distributing data packets to a communication path 500 that needs disconnections/connections for a long time.

According to a preferred mode, the scheduling module 203 acquires the short-term historical data 602 through the first data, the second data, and the third data of the data-acquiring module 202. Preferably, the short-term historical data 602 refer to the first data and/or the second data and/or the third data observed in the past third period, such as the throughput of the client 100. Preferably, the third period may be several seconds or a few minutes, according to user definition.

Preferably, the scheduling module 203 fuses the location-awareness-based multi-day network performance data 601 and the short-term historical data 602 through: unifying the location-awareness-based multi-day network performance data 601 and the short-term historical data 602 into context data 600 of an estimate of a network performance indicator in a complementary manner. Preferably, since the multi-day network performance data 601 are location-awareness-based predicted network performance data obtained through observation for several days, the network performance data in different time periods may have significant variations and information from different sources can be inconsistent to each other. These causes of unreliability can be addressed using the short-term historical data 602 observed in a short period of time. Preferably, fusion is conducted according to the inconsistency between the multi-day network performance data 601 and the short-term historical data 602, or variances. Preferably, as inspired by the fact that the method having smaller variances is the better, the present invention proposes a minimum-variance unbiased estimate, which is basically a weighted average from plural sources. A weight is a normalized indicator in inverse proportion to a variance, or has linear relationship with the confidence level. Specifically, the estimator is in the form of.

$$E = \frac{\sum_i \frac{v_i}{\sigma_i^2}}{\sum_i \sigma_i^{-2}}$$

where E is the estimated TCP performance indicator (e.g., bandwidth or RTT), namely the context data 600, vi is the value of the information source i, and $\sigma_i^2$ is the variance of the information source i. Preferably, the confidence level of the database is used as the reciprocal of $\sigma_i^2$, being used as the long-term experience data, namely the multi-day network performance data 601, and the variance of the throughput sample is $\sigma_i^2$, being used as the short-term historical data 602.

According to a preferred mode, the scheduling module 203 is configured to: sense disconnections/connections of different standard networks based on the estimate of the network performance indicator; predict probabilities of switching results among the different standard networks based on the sensed disconnections/connections of the different standard networks; and generate risk switching results based on the predicted probabilities of the different switching results, wherein the switching results include Success, Failure, and Blackout. As proven by a large amount of LTE mobility trace data, not all cells have a highly certain switching result. There are about 20% of all the cellular cells finding the maximum probability values in their switching tuples {success, failure, blackout} smaller than 80%. A false positive result, meaning that successful switching is predicted as failure, will lead to self-limitation and insufficient bandwidth usage. A false negative result, meaning that failed switching is predicted as succeed, will lead to packet loss and highly out-of-order delivery delay, particularly during a session where data streams are distributed to plural communication paths 500.

Preferably, the scheduling module 203 is configured to acquire the risk switching result through: assigning different penalty values to wrong predictions about Success, Failure, and Blackout, as shown in FIG. 2. Preferably, the penalty value for wrongly predicting Success as Failure is 1, and the penalty value for wrongly predicting Success as Blackout is 2 because the disconnection time for Blackout is twice as long as Failure. The penalty value for wrongly predicting Failure or Blackout as Success is 1. Preferably, the penalty value set as 1 or 2 is qualitative, not quantitative. Preferably, a risk decision table is constructed from the penalty value and the probabilities of prediction as Success, Failure, and Blackout, as shown in FIG. 2. A risk switching result can then be generated based on the minimal risk value obtained from the risk decision table. Preferably, the penalty value set herein is qualitative, not quantitative. The risk of entering a new cellular cell for every decision is calculated according to the empirical probability, and the decision having the minimal risk value is select so as to implement better risk management. For example, if the switching probabilities are {0.2, 0.3, 0.5}, the risks of these decisions are {0.8, 0.7, 1.0}, and the prediction of the risk switching result is Failure instead of Blackout. For further mitigating the influence of false positive, instead of stopping transmitting any data packet, redundant copies of data packets are transmitted through other communication paths 500. With the foregoing arrangement, favorable effects such as faster cross-path retransmission can be provided, thereby reducing out-of-order delivery delay and packet loss.

Preferably, the network intermediate device of the present embodiment is compatible with the existing multi-path transmission protocol (MPTCP), and further compatible with non-MPTCP-supportive network middleware. Preferably, as shown in FIG. 1, the scheduling module 203 is configured to distribute the data received by the transceiver modules 201 to the first path 210 processing the data while bypassing the kernel protocol stack 230 and to the second path 220 processing the data while passing through the kernel protocol stack 230. Preferably, processing the data while bypassing the kernel protocol stack 230 is achieved by scheduling the data through the original socket 242 instead of the standard socket 241. With this configuration, the original socket 242 can receive and transmit data packets that have not been processed by the kernel protocol stack 230, so calling of the data is at the user space 240 but not the kernel space 250. This eliminates the need of reforming the kernel or modifying the application, and is compatible with the network middleware extensively deployed in the prior art, thereby favorable to practical deployment of the network intermediate device disclosed in the present embodiment. Preferably, as shown in FIG. 1, the second path 220 receives and transmit data packets through the standard socket 241. All the data packet received and transmitted through the standard socket 241 have been processed by the kernel protocol stack 230. With this configuration, the second path 220 may be used to transmit control information, like settlement.

Preferably, the scheduling module 203 analyzes received data using the transceiver module 201 and classifies the received data, thereby distributing data of an editable, specific data type to the first path 210. The scheduling module 203 classifies the received data through: determining whether the frame structure of the received data accords with the frame structure of the specific data type; and determining whether the received data are directly connected to the target client 100 or the target server 400. Preferably, the specific types of data at least include the protocol format used by data and the source address of data. For example, according to the source address, whether the data are data transmitted by the client 100 directly served. For example, according to the protocol format of the data, multi-path transmission can be optionally performed on data of a specific protocol. Preferably, as shown in FIG. 1, the transceiver module 201 may analyze data of different communication protocols and/or in different formats, thereby distributing the relevant data to the first path 210 according to the custom, specific type of data. With this configuration, protocol conversion can be automatically done for the data received from the client 100 through the transceiver module 201, without the need of an extra module, thereby enhancing compatibility, and significantly reducing difficulty in programming.

Preferably, the scheduling module 203 maps the data processed in the first path 210 to at least two mutually independent communication paths 500, so as to construct a multi-user multi-path transmission framework at the level of the user space 240.

With the foregoing arrangement, the present embodiment has the following beneficial effects. The first processing path 210 uses the original socket 242 thereby in the user space 240 processing the data streams transmitted by the clients 100 or servers 400 so as to bypass the kernel. Thereby, the data of the clients 100 are transmitted at the level of the user space 240, so that the logic of multi-path packet scheduling is lifted to the user space 240 where it is applied to applications. This allows packets to be scheduled from a global perspective with the consideration of both dynamic variation of networks and regulations of applications, so as to optimize aggregative QoE. Additionally, the arrangement that both multi-path transmission and packet scheduling are done in the user space 240 is favorable to integration and driving of context data related to network performance, and is highly scalable so that new packet scheduling strategies can be integrated, thereby facilitating deployment and performance optimization.

Preferably, as shown in FIG. 1, at least two mutually independent, available communication paths 500 may exist between the network intermediate device of the present embodiment and a multi-path module 300 at the side of the servers 400. Preferably, the communication paths 500 may be realized in various ways flexibly. For example, a TCP link may be used as a communication path 500. Alternatively, a link based on the stream control transmission protocol (SCTP) may be used as a communication path 500. Preferably, the scheduling module 203 inversely multiplexes the data in the first path 210 to plural communication paths 500, thereby transmitting the data in the first path 210 through the TCP socket in every communication path 500. Both the TCP effective payload and the control data are packaged into the transmission layer. Preferably, a user may select plural congestion control algorithms according to the use environment. For example, the TCP BBR congestion control algorithm may be selected to reduce end-to-end delay and packet loss. Preferably, inversely multiplexing is about having the scheduling module 203 segment the data streams coming from the first path 210, packeting them into messages, and distributing the messages to pipes. e Therein, every message has a header, which contains information of the ID, the length, and the serial number of the connected application.

Preferably, the multi-path module at the side of the servers 400 may be the network intermediate device of the present embodiment, or alternatively be another proxy server capable of multi-path transmission. Data transmission is achieved by: having the scheduling module 203 distribute the user data to at least two communication paths 500, so as to take the advantage of multipath diversity to realize bandwidth aggregation, The data packets can be transmitted through plural paths to the network intermediate device installed at the side of the servers 400. Herein, the network intermediate device extracts the data packets coming from multiple paths, and restores them into the data transmitted by the clients 100. Afterward, the data from the clients 100 are transmitted to the servers 400. When the servers 400 feed data back to the clients 100, the network intermediate device establishing sessions with the servers 400 is functionally similar to the network intermediate device at the side of the clients 100. In other words, it transmits data of the specific data type to the network intermediate device at the side of the clients 100 through the original socket 242 by inversely multiplexing through at least two mutually independent communication paths 500. With the foregoing arrangement, by inversely multiplexing through multiplex communication paths 500 and selecting different transmission-layer communication protocols, overheads for establishing connections (such as slow startup) can be eliminated, thereby providing short streams with instant benefits and making traffic in every pipe denser, leading to better broadband usage.

Preferably, the scheduling module 203 transmits and processes the user data in the first path 210 in a separate network namespace. With the foregoing arrangement, potential conflicts with kernel configurations of other programs can be prevented, and potential security concerns can be mitigated. For example, for operations on the proxy server provided in the present embodiment for which reverse path filtering has to be banned, by letting a virtual Ethernet equipment that forwards data packets to a physical network interface card receive a data packet of any source IP generated by the network intermediate device of the present embodiment, security risk incurred thereby will be separated from normally running programs, and is managed by the scheduling module 203 in its own network namespace.

Preferably, the network intermediate device of the present embodiment is deployed as shown in FIG. 1. The clients 100 may be connected to the transceiver modules 201 through a wireless or wired manner. For example, they may be connected to the transceiver modules 201 through wireless access points (APs). Alternatively, they may through be connected to the transceiver modules 201 through wired connections. The multi-path module may similarly be connected to the servers 400 through a wired or wireless manner. The network intermediate device of the present embodiment can access different core networks through a base station (such as BTS, NodeB, eNodeB, etc.), and access a short wave communication network, GPS, a satellite communication network, a cellular mobile network, PSTN, ISDN, the Internet, etc. through a core network. In different application scenarios, the network intermediate device of the present embodiment is deployed at different locations. For example, the network intermediate device may be deployed on a data forwarding node of a home gateway, a router, and a customer premise equipment (CPE) at the client 100. The network intermediate device of the present embodiment may also be deployed on a hybrid access aggregation point (HAAP) node. For example, both the 3G core network elements SGSN (Serving GPRS Support Node) and GGSN (Gateway GPRS Support Node) can be conceivable. Preferably, it can also be deployed in the 4G core network. For example, it can be deployed on the network elements of all-IP packet core network EPC (Evolved Packet Core) of the LTE (Long Term Evolution), such as SGW (Serving Gateway) and PGW (PDN Gateway).

Preferably, the network intermediate device of the present embodiment can have multi-path connection with a multi-path module or another the network intermediate device of the present embodiment deployed at the server 400. The network intermediate device of the present embodiment may provide different functions depending in where it is deployed. For example, in subways, trains, or multiple units moving at high speed, due to limitation caused by rapid movement and complex terrain, the mobile networks of passengers can be frequently interrupted. Thus, the mobile communication equipment of the present embodiment may be deployed in these vehicles, and allow the user equipment of the passengers to access through APs, thereby using mobile networks of different frequency bands provided by different operators and multi-path module having the function of multi-path transmission to establish connection. Alternatively, it may be connected to another network intermediate device deployed at the server 400 to realize multi-path transmission. For example, in public places having busy human traffic, like train stations and airports, the network intermediate device of the present embodiment may be connected with users through multi-band Wi-Fi, and the multi-path module or another network intermediate device of the present embodiment may be connected to equipment providing users with network services, so as to provide the network access function based on multi-path transmission for numerous users. Preferably, if the multi-path module having the multi-path transmission function or another network intermediate device deployed at the side of the servers 400 is deployed in the backbone network of a content delivery network (CDN) provider, the multi-path transmission technology may be sued to make user access the CDN more efficiently. Alternatively, the multi-path module having the multi-path transmission function or another network intermediate device at the side of the servers 400 may be deployed in a specific local area network, so as to obtain the effect similar to a virtual private network VPN, which means the data in the local area network can be access from outside, and gain in transmission efficiency provided by multi-path transmission provide can be achieved.

Embodiment 2

The present embodiment provides a multi-path transmission relay method, which comprises deploying a first data relay processing module 200 in a route path for communication between a plurality of clients 100 and a plurality of servers 400. The method further comprises: having the first data relay processing module 200 establish multi-path connection with a plurality of clients 100 or servers 400 capable of multi-path transmission or with a second data relay processing module 300 having communication sessions with the servers 400. Preferably, the first data relay processing module 200 and the second relay data processing module have the same functions. Preferably, the first data relay processing module 200 and the second data relay module 300 are configured to predict network performance by means of fusing location-awareness-based multi-day network performance data 601 and short-term historical data 602, and map the received data from the clients 100 or the servers 400 to at least two mutually independent communication paths 500 based on the predicted network performance, thereby implementing multi-path transmission between the clients 100 and the servers 400. Preferably, as shown in FIG. 3, the first data relay processing module 200 and the second data relay processing module 300 establish a multi-path transmission link. Preferably, the first data relay processing module 200 has functions corresponding to those of the network intermediate device as described in Embodiment 1. It also predicts network performance by means of fusing the location-awareness-based multi-day network performance data 601 and the short-term historical data 602, and accordingly distributes the data of the clients 100 or the servers 400 to different communication paths 500. No repetition is made herein.

According a preferred mode, the first data relay processing module 200 and the second data relay module 300 distribute the received data of the clients 100 or the servers 400 to the first path 210 for processing the data while bypassing the kernel protocol stack 230 and the second path 220 for processing the data while passing through the kernel protocol stack 230. The first data relay processing module 200 and the second data relay module 300 map the data processed in the first path 210 to at least two mutually independent communication paths 500, so as to construct a multi-user multi-path transmission framework at the level of the user space 240. Preferably, first data relay processing module 200 and the second data relay module 300 of the present embodiment construct the multi-path transmission framework in the user space 240 in the way identical to that described for Embodiment 1, and therefore can be integrated in the existing network middleware, without the need of modifying the kernel. Preferably, the first data relay processing module 200 and the second data relay module 300 construct the multi-path data transmission framework at the level of the user space 240 in the way identical to that described for Embodiment 1. No repetition is made herein.

Embodiment 3

The following embodiment shall be regarded as further improvement or supplement to Embodiment 1 or 2, or any combination thereof, and thus no repetition is made herein.

Figure 6:
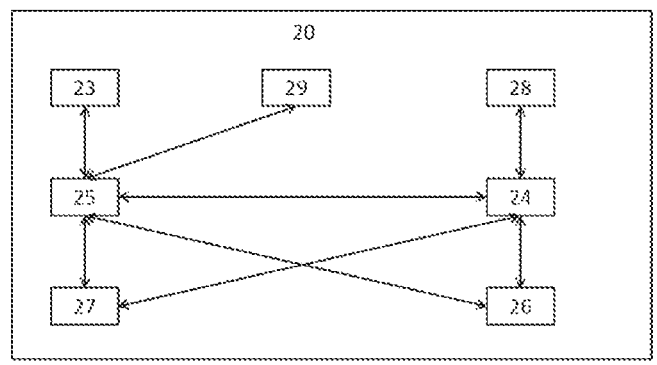
FIG. 6 is a schematic structural diagram of the second communication module of the present invention.

As shown in FIGS. 4, 5, and 6, the present invention further provides a location-awareness-based network intermediate device, to be deployed at a first terminal 30 and/or a second terminal 40. The network intermediate device performs fusion assessment on data packet information from different sources based on long-term historical data and short-term historical data, and performs information fusion on the data packet information fitting in a fusion threshold range. long-term historical data are historical network performance data for at least one day that store location awareness. The short-term historical data are network performance data of a first terminal 30 and/or a second terminal 40 monitored in a short-term time threshold. Preferably, the first terminal 30 may be a client, such as a mobile phone, a computer, or a smart device. The second terminal 40 of the second communication module may be a server or a server group, such as a cooperative positioning server group. Preferably, a network intermediate device of the present invention is provided between at least one first terminal 30 and at least one second terminal 40.

Preferably, the network intermediate device exists in a way that its information is unknown to the first terminal 30 and the second terminal 40. Preferably, for the convenience of expression, the network intermediate device located at the side of the first terminal 30 is named as the first communication module 10. The network intermediate device at the side of the second terminal 40 is named as the second communication module 20. The first communication module 10 and the second communication module 20 are connected through TCP data connections that form data stream channels, also referred to as data stream pipes. Preferably, both the TCP effective payload and the control data are packaged into the transmission layer. The first communication module 10 and the second communication module 20 are approximately symmetrical so they have the same multi-path data plane, the same scheduling program, and the same network performance database. Preferably, the first communication module 10 is provided with a user space cellular message log recording module, such as a real-time analysis module, for conducting in-operation analysis (e.g., signal strength trace, switching indication and MAC layer loss detection) and packet scheduling. It can directly instruct the up-going scheduling program at the transmitting party, or indirectly instruct the down-link scheduler to transmit cellular information through the up-link (with location-awareness-based scheduling). The signal strength is used for offline lookup of network performance. The additional cellular information is used for online complementary optimization. Preferably, the higher layer protocol of the data transmission protocol between the first communication module 10 and the second communication module 20 is for executing inverse multiplexing in the user space.

As shown in FIG. 4, the first communication module 10 comprises a first APP resource module 18, a first network performance database 19, a first real-time analysis module 13, a first distributing module 14, a first scheduling module 15, a first multiplexing and demultiplexing module 16, and a first TCP socket module 17. The first APP resource module (client APP Data) 18 is for acquiring user resources information of the first terminal, and forwarding the data from the first distributing module 14 to the user. The first network performance database 19 may be a location-awareness-based network performance database. It only depends on cellular signals to provide predictive network conditions, including the TCP performance indicator and switching information, and is robust against connection abnormality. The first real-time analysis module 13 is for collecting in-operation cellular information/messages from the 3G/4G or 5G chip group operating the cellular network. The first distributing module 14 is for distributing the data streams transmitted by the first terminal. The data streams are divided into data packets with different features, so that the data from the first multiplexing and demultiplexing module 16 are forwarded to the users through the first APP resource module 18 at the same time. Preferably, the first distributing module 14 is provided with or can generate several first virtual transceivers. The virtual transceivers are for receiving or transmitting data packets of the path transmission network. Preferably, every virtual transceiver has a data receiving or transmitting port, so that several virtual transceivers have several data receiving or transmitting ports. In other words, the first distributing module 14 has several data receiving or transmitting ports. Having the virtual transceivers is advantageous because the TCP data are transmitted to the virtual transceivers during the process of sniffing the data information without intervening the original data streams, and with the reasonably configured virtual transceivers, the kernel protocol stacks in the IT system can discard all the input data. Meanwhile, the virtual transceivers capture data packets so as to sniff the data information without intervening the original data streams. During data transmission, the virtual transceivers send data packet to the second communication module 20 through reasonably configured paths, and transmits them to the users. With this arrangement, the present invention can be compatible with various standard physical interface controllers without modifying the programs.

Preferably, the first scheduling module 15 can provide an abstract to unify heterogeneous context data. Interface binding and radical recombination are taken as means to mitigate out-of-order delivery delay, and under highly dynamic network conditions and the situation that information is unavailable, the aggregative QoE can be enhanced. In other words, it is about taking a manner of multi-stage packet scheduling to perform information recombination on data packet information streams. The first multiplexing and demultiplexing module 16 is for combining plural signals and transmitting the combination in a physical channel, or, in the opposite direction, demultiplexing signals in a physical channel to plural signals. The first TCP transmitting socket module 17 is for reading or extracting socket information from the information. The second communication module 20 similarly has the corresponding modules. The second APP resources module 28 is for acquiring resources information of the second terminal 40, and forwarding the data from the second distributing module 24 to the users. The second network performance database 29 may be a location-awareness-based network performance database. It only depends on cellular signals to provide predictive network conditions, including the TCP performance indicator and switching information, and is robust against connection abnormality. The second real-time analysis module 23 is for collecting in-operation cellular information/messages from the 3G/4G or 5G chip group operating the cellular network.

The second distributing module 24 is for distributing the data streams transmitted by the second terminal, dividing them into data packets with different features, and forwarding the data from the second multiplexing and demultiplexing module 26 to the users.

Preferably, the second distributing module 24 may be provided with or can generate several second virtual transceivers. The second scheduling module 25 can provide an abstract to unify heterogeneous context data. Interface binding and radical recombination are taken as means to mitigate out-of-order delivery delay, and under highly dynamic network conditions and the situation that information is unavailable, the aggregative QoE can be enhanced. In other words, it is about taking a manner of multi-stage packet scheduling to perform information recombination on data packet information streams. The second multiplexing and demultiplexing module 26 is for combining plural signals and transmitting the combination in a physical channel, or, in the opposite direction, demultiplexing signals in a physical channel to plural signals. The second TCP socket module 27 is for reading or extracting socket information from the information.

Preferably, in the present invention, the first communication module 10, the second communication module 20 and all the modules therein may be integrated chips, processors, servers 400 or a combination thereof. For example, the first communication module 10 and the second communication module 20 may be processors or chips capable of executing corresponding computer instructions. Preferably, the first APP resource module 18 and the second APP resource module 28 may be integrated chips, processors, servers, or a combination thereof capable of sniffing data information and forwarding the data without interfering with the original data stream. The first network performance database 19 and the second network performance database 29 may be integrated chips, processors, servers, or a combination thereof that provide predictive network conditions including TCP performance indicators and switching information based on cellular signals. The first real-time analysis module 13 and the second real-time analysis module 23 may be integrated chips, processors, servers, or a combination thereof for collecting in-operation cellular information/messages from the 3G/4G or 5G chip group operating the cellular network. The first distributing module 14 and the second distributing module 24 may be integrated chips, processors, servers, network interface cards, or a combination thereof for distributing the data streams and forwarding the data from the multiplexing and demultiplexing module to the users. The first scheduling module 15 and the second scheduling module 25 may be integrated chips, processors, servers, or a combination thereof that taking a manner of multi-stage packet scheduling to perform information recombination on data packet information streams. The first multiplexing and demultiplexing module 16 and the second multiplexing and demultiplexing module 26 may be integrated chips, processors, servers, or a combination thereof for executing multiplexing and demultiplexing instructions. The first TCP socket module 17 and the second TCP socket module 27 may be TCP socket modules for reading or extracting socket information from the information.

Specifically, as shown in FIG. 5, in the first communication module 10, the first APP resource module 18 performs data connection with the first distributing module 14 and the first terminal 30 respectively, and sends the interactive resource information to the first distributing module 14. The first scheduling module 15 establishes data connections with the first network performance database 19, the real-time analysis module 13, the first distributing module 14, the first multiplexing and demultiplexing module 16 and the first TCP socket module 17 respectively. The first distributing module 14 also establishes data connections with the first multiplexing and demultiplexing module 16 and the first TCP socket module 17 respectively.

Specifically, as shown in FIG. 6, in the second communication module 20, the second APP resource module 28 performs data connection with the second distributing module 24 and the second terminal 40 respectively, and sends the interactive resource information to the second distributing module 24. The second scheduling module 25 establishes data connections with the second network performance database 29, the second real-time analysis module 23, the second distributing module 24, the second multiplexing and demultiplexing module 26 and the second TCP socket module 27 respectively. The second distributing module 24 also establishes data connections with the second multiplexing and demultiplexing module 26 and the second TCP socket module 27 respectively.

Preferably, the data transmission is bidirectional, i.e., it can be from the first terminal 30 to the second terminal 40 or from the second terminal 40 to the first terminal 30. The way of data transmission from the first terminal 30 to the second terminal 40 is similar to the way of data transmission from the second terminal 40 to the first terminal 30, and all work on the same principle. Preferably, the method of the present invention for forwarding data through multi-path transmission is about having the first communication module 10 and/or the second communication module 20 sniff data information between the first terminal 30 and the second terminal 40 without intervening the original data stream and recombine the select part of the information according to the preset information recombining rules before transmitting it to the corresponding second communication module 20 and/or the first communication module 10 through at least two transmission paths, and having the first communication module 10 and/or the second communication module 20 discard unnecessary data information during operation.

Preferably, the first communication module 10 establishes a data connection with the first terminal 30. The second communication module 20 establishes a data connection with the second terminal 40. Among the at least two static multiple paths established between the first communication module 10 and the second communication module 20, every path can select its own data transmission protocol.

Preferably, the first distributing module 14 can be provided with several first virtual transceivers. The second distributing module 24 can at least be provided with several second virtual transceivers. Preferably, the first virtual transceiver and the second virtual transceiver may each be a virtual network interface card. The first distributing module 14 classifies the data coming from the first terminal 30 by, for example, determining whether it follows the TCP/IP protocol. The first distributing module 14 forwards the classified data to the virtual transceivers, so that the forwarded to the virtual transceivers are all data of the specific type. The advantage provided by doing so is that when the first distributing module 14 forwards data to the virtual transceivers supported by the kernel, the kernel can automatically do protocol conservation, without using any additional module. This enhances compatibility and significantly reduces difficulty in programming. As a result, the virtual transceivers always get data of the same format, and thus are free from the work of identifying various protocols and dealing with diverse complicated data formats. Meanwhile, data not belonging to the first terminal 30 remain to be processed by the virtual transceivers according to the predetermined manner. For example, the virtual transceivers may also have other functions, such as transmitting control information for settlement, so the product of the present invention is easy to deploy, without intervening the existing functions of the first communication module 10 and the second communication module 20.

Preferably, the first virtual transceivers and the second virtual transceivers form a static multi-path data transmission network wherein they exchange resources and information in a manner that none of them is exclusively corresponding and connected to another. Preferably, the virtual transceivers acquire data frames by capturing packets, such as acquiring Ethernet frames. The virtual transceivers process and forward the user data packets contained in the data frames, and prevent the user data packets contained in the data frames from entering the protocol stacks corresponding to the virtual transceivers. Preferably, the virtual transceivers transmit the user data packets acquired from the data frames to interfaces of virtual transceivers at the other end through static multi-path data connections.

Preferably, the static multi-path data transmission network includes several static transmission paths. Each static transmission path can be configured flexibly. For example, the paths may use different protocols or congestion control algorithms. Preferably, connections of the data transmission path network are established by the first communication module and the second communication module are a handshake manner. Every static multi-path data connection is constructed by a first communication interface and a second communication interface only. Additionally, every first communication interface establishes static multi-path data connections with several second communication interfaces, respectively, vice versa. Every second communication interface establishes static multi-path data connections with several first communication interfaces, respectively. The advantage of establishment of the static multi-path data transmission network is that every data packet can be sent to the destination in the most flexible manner at the fastest possible speed, without data delay due to path congestion.

Preferably, data transmission channels between the first communication module 10 and the second communication module 20 are referred to as static transmission paths. Both the TCP effective payload and the control data are packaged into the transmission layer. The paths may be in various forms. For example, in the first communication module 10, the up-going TCP data coming from the application are segmented and packaged into messages, which are then distributed to paths. For example, the TCP connection having the longest life is regarded as a path. Every message has a small header, which contains information of the ID, the length, and the serial number of the connected application. Upon reception of a message, the second communication module 20 extracts data to recombine the data packets, and forwards them to the second terminal 40 based on the connection IDs. The down-link traffic is processed similarly but in the opposite direction. In the present invention, the control data (e.g., TCP SYN, FIN, and RST) are also packaged into control messages for achieving application connection management. The present invention uses the long-life TCP path for the advantage that overheads for establishing connections can be eliminated (e.g., slow startup), which gives direct benefit to short streams, particularly in a high-loss environment. In this way, the traffic in every path can be denser, thereby improving bandwidth usage.

Preferably, the present invention makes information unavailable by: in the user space, receiving and transmitting data packets of any source IP between the first virtual transceivers and the second virtual transceivers through the original socket interface, and, in a separate network namespace, extracting the data packets so as to prevent conflict with operating kernel configurations used by third-party programs. In the prior art, MPTCP involves kernel modification and middleware incompatibility. Therefore, the IT operating system carried by middleware, such as Linux, has to be modified at its kernel before it can support MPTCP. The present invention advantageously makes the information unavailable so that bypassing the kernel can be achieved, which makes it easy to deploy in an operating IT system, without any modification. Preferably, the present invention may further ban the operation of reverse path filtering in the first communication module 10. This makes the virtual Ethernet equipment of the network interface card that forwards data packets to the first communication end or the second communication end receive data packets of any source IP generated according the present invention, thereby isolating the incurred security risk from the normally running programs. Moreover, the data forwarding equipment for multi-path transmission according to the present invention is able to perform management in its own namespace.

In the present invention, a path is built for every communication interface, and uses multiplexing in a multi-path scene naturally. Specifically, the present invention allows flexible mapping between users and paths. The data streams from different users may be multiplexed in the same path, and the traffic of the same user may be distributed to plural paths. The traffic distribution of every path is executed by the two scheduling modules strategically. The first scheduling module 15 is installed in the first communication module 10, for scheduling up-link traffic. The second scheduling module 25 is installed in the second communication module 20, for scheduling down-link traffic. The first scheduling module 15 and the second scheduling module 25 jointly consider plural factors or contexts for multi-path and multi-user scheduling at the level of data packets and at the level of traffic, respectively. For example, reinjected data packets of a connection may be distributed to plural interfaces so as to improve out-of-order delay, or, when the overall traffic load is light, plural connections may share the optimal interface as much as possible. In other words, the first scheduling module and the second scheduling module schedule contexts based on multi-dimensional coordinate context data, thereby enhancing the sharing rate of the first virtual transceiver or the second virtual transceiver among plural transmission paths.

Preferably, the first scheduling module and the second scheduling module coordinate the context data so as to schedule contexts according to context dimensions including the following types. The pipe context is related to end-to-end aggregation performance of data streams in paths between the first communication module 10 and the second communication module 20, such as parameters like the throughput per second and round-trip delay of paths. Preferably, trace data packets may further be set in every path for collecting data and for acquiring the pipe context according a custom method for calculating statistic data. The connection context is related to enumeration of factors affecting QoE optimization at the level of connections, such as traffic/traffic types and completion percentages. Preferably, in the present invention, the first scheduling module 15 and the second scheduling module 25 perform priority sorting on HTML documents according to the connection context, so as to mitigate HoL in crucial paths. Preferably, the first scheduling module 15 and the second scheduling module 25, according to the connection context, monitor transmission activities and bytes at the traffic level and at the user level, respectively, so as to perform co-stream scheduling and provide bandwidth assurance based on priority/fairness consideration. The third-party context can be any context coming from internal or external libraries or application modules except for the pipe context and the connection context, such as real-time switching signals and the PHY-layer bandwidth, cell IDs and the signal strength. The first network performance module predicts estimated network performance according to the cell IDs and signal strength in a location-awareness-based manner. Preferably, the first scheduling module 15 and the second scheduling module 25 acquire congestion windows according to the socket of every path, and perform congestion-aware interface scheduling.

Preferably, in the present invention, the first scheduling module 15 and the second scheduling module 25 use a micro-service structure to organize and coordinate all independently developed context generators, so as to merge copious context data to data-driven packet scheduling. Preferably, the first scheduling module 15 and/or the second scheduling module 25 are each provided with a context data manager, which allows the context generator to register its context type, and provides use instances for the data packet scheduling program or other context generators.

Preferably, the second scheduling module 25 in the second communication module 20 recombines the data packets received by the second virtual transceivers through data transmission paths into the inversely multiplexed data streams according to the preset information recombining rules, and output them to the second terminal 40 in a multi-path manner. Preferably, the preset information recombining rules are: performing fusion assessment on network performance data information from different sources based on long-term historical data and short-term historical data, and performing information fusion on the data information fitting in a fusion threshold range. Preferably, the specific fusing operation is identical to what has been described with reference to Embodiment 1, and is not repeated herein.

Embodiment 4

The following embodiment shall be regarded as further improvement or supplement to Embodiment 1, 2 or 3, or any combination thereof, and thus no repetition is made herein.

Figure 7:
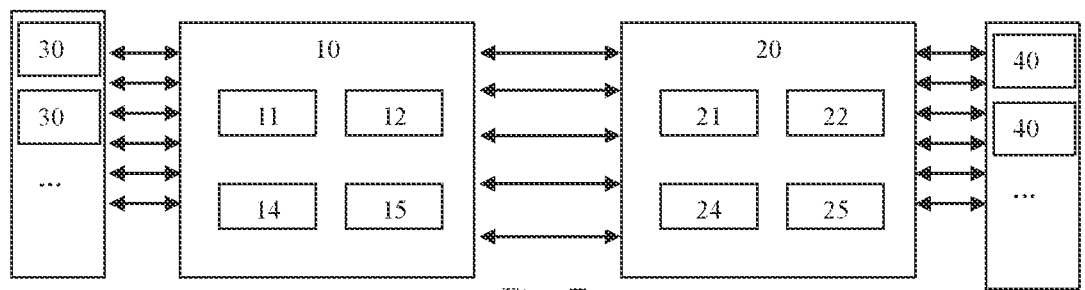
FIG. 7 is a framework diagram of a multi-path parallel transmission communication system of the present invention.
Figure 8:
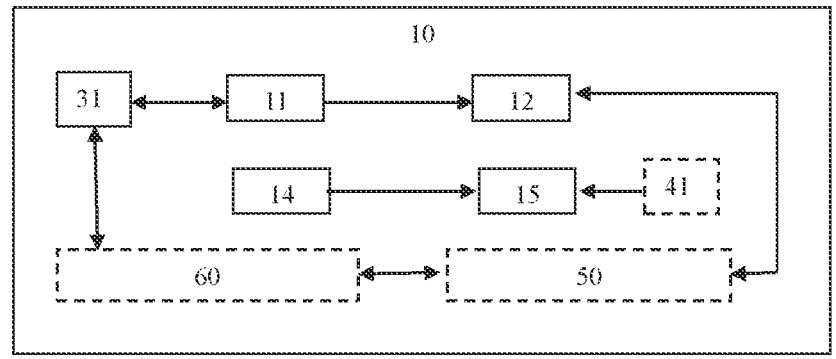
FIG. 8 schematically illustrates one mode of the communication module of Embodiment 4.
Figure 9:
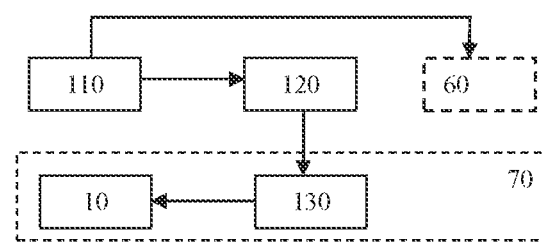
FIG. 9 schematically illustrates an information sniffing process of the communication module of Embodiment 4.

As shown in FIGS. 7, 8, and 9, the present invention further provides a location-awareness-based network intermediate device, to be deployed at a first terminal 30 and/or a second terminal 40. The network intermediate device comprises at least one processor, which is configured to perform relevance merging on data packets received by the network intermediate device according to preset data stream recombining rules so as to obtain the data, and transmit the merged data to terminals in data connection thereto through communication interfaces. The preset data stream recombining rules are: performing fusion assessment on network performance data information from different sources based on long-term historical data and short-term historical data, and performing information fusion on the data information fitting in a fusion threshold range. The long-term historical data are historical network performance data for at least one day that store location awareness. The short-term historical data are network performance data of the first terminal 30 and/or the second terminal 40 monitored in a short-term time threshold. Preferably, the fusion assessment is about minimum variance unbiased estimate of the weighted average of plural data sources. Preferably, the specific fusing operation is identical to what has been described with reference to Embodiment 1, and is not repeated herein.

Preferably, for the convenience of expression, the network intermediate device located at the side of the first terminal 30 is named as the first communication module 10. The network intermediate device at the side of the second terminal 40 is named as the second communication module 20. As shown in FIG. 7, the first communication module 10 and the second communication module 20 are symmetrically arranged. Thus, the first communication module 10 and the second communication module 20 have the same structures and functions. The processor of the first communication module 10 at least includes a first information sniffing module 11, a first path management module 12, a first distributing module 14, and a first scheduling module 15. Preferably, the first information sniffing module 11 can be in communication connection with an original socket interface 31 and/or the first path management module 12. The first path management module 12 can be communicatively connected to a transmission layer interface 50. The first scheduling module 15 can be communicatively connected to the first distributing module 14 and/or a context data source 41. Each module in the present invention may be integrated chips, processors, servers or server groups carrying related functions. The first information sniffing module 11 can be integrated chips, processors, servers or server groups capable of sniffing information. The first path management module 12 can be integrated chips, processors, servers or server groups capable of buffering and sending data, or executing related computer instructions. The first distributing module 14 can be integrated chips, processors, servers or server groups capable of distributing, classification or executing related computer instructions. The first scheduling module 15 has a scheduling function, or performs related scheduling operations based on a scheduling algorithm.

Preferably, the first information sniffing module 11, the first path management module 12, the first distributing module 14, and the first scheduling module 15 are similar to the second information sniffing module 21, the second path management module 22, the second distributing module 24, and the second scheduling module 25, respectively. Preferably, the first information sniffing module 11 is for receiving original data information from the user space through the original socket interface and dividing it into several data packets. Preferably, where the communication module actively hears original data information of transmission paths between the first terminal 30 and the second terminal 40, the first information sniffing module 11 sniffs the data information without intervening the original data streams, and then actively discards data packets of the original information data. Discarding the original data information not only helps reduce space occupancy in the memory, but also prevents the kernel protocol stack of the IT system of the transmission path, which otherwise would be passed by the original data information, to respond to the TCP/IP protocol data packet contained in the original data information. Stated differently, in the present invention, parallel, multi-path transmission is formed between the two communication modules to take the place of the TCP/IP protocol stack of the transmission path of the original data information to process data, so that no conflict will happen. As shown in FIG. 8, the original socket interface 31 is for sniffing the data sent by a user to a server 400 or the data sent by a server 400 to a user. Its relationship with the kernel protocol stack 60 is that: the original socket interface 31 is the data packet sniffing interface opened to the user space by the kernel protocol stack 60, and is different from the standard socket. The data packets int the original socket interface 31 are not processed by the kernel protocol stack. By calling the interface, the function of data packet sniffing can be achieved. The first information sniffing module 11 calls the original socket interface 31 to acquire original data information from plural users/servers, and identifies the users according to the headers of the data packets. Therein, when the first information sniffing module 11 sniffs the data packets from the kernel, format conversion is performed, so that the network interface controller can always get data in the same format, and thus are free from the work of identifying various protocols and dealing with diverse complicated data formats. The first path management module 12 is for caching data coming from the first information sniffing module 11 and transmitting the data. The first distributing module 14 is for manage every user by means of multi-path transmission connection. Preferably, the first distributing module 14 performs multidimensional classification on the data packets based on a preset or in-operation dynamically assigned distribution statistic algorithm, so as to conduct distribution matching the parallel, multi-path transmission state. The multidimensional classification may be performed by considering at which priority levels the multi-path transmission connections are used by the user, how the data of the user distributed over the individual connections for multi-path transmission, and whether the TCP/IP protocol is used. The advantage of such distribution is that: the first distributing module manages data packets as streams, thereby enhancing efficiency of multi-path data transmission. Preferably, the distribution statistic algorithm may include at least one of the connection sequence scheduling algorithms, the data sequence scheduling algorithm, and the transmission path scheduling algorithm.

Preferably, the distribution statistic algorithm is selected from pe-stored distribution statistic algorithms and dynamically assigned. Such dynamic assignment of the distribution statistic algorithm is advantageous because the distribution statistic algorithm can be flexible changed according to the actual situation, so as to prevent data stream congestion that might otherwise happed if the mechanically assigned distribution statistic algorithm is not suitable for the actual situation.

Preferably, the first scheduling module 15 determines transmission paths for data packets and communication interfaces at two ends of each path based on the distribution strategy provided by the first distributing module 14, the contextual features of the context data source, and at least one scheduling algorithm. As shown in FIG. 8, the context data source 41 provides scalable data for various scheduling algorithms to use. The sources of data provided by the context data source 41 may be the kernel, or may be the user space. The first scheduling module 15 determines to which transmission connection or sub-communication module or communication interface the first path management module 12 shall send the user data by reading the distribution strategies for individual user connections transmitted by the first distributing module 14 and the data provided by the context data source 41. The first path management module 12 performs multi-path parallel transmission on the data packets transmitted by the first information sniffing module 11 through the data packet transmission paths determined by the first scheduling module 15 based on the scheduling algorithm.

Preferably, traffic distribution of every path is executed by two scheduling modules strategically. The first scheduling module 15 is installed in the first communication module 10, and used for up-link traffic scheduling. The second scheduling module 25 is installed in the second communication module 20, and used for down-link traffic scheduling. The first scheduling module 15 and the second scheduling module 25 consider plural factors or contexts for multi-path and multi-user scheduling at the level of data packets and at the level of traffic, respectively. For example, reinjected data packets of a connection may be distributed to plural interfaces so as to improve out-of-order delay, or, when the overall traffic load is light, plural connections may share the optimal interface as much as possible. In other words, the first scheduling module and the second scheduling module schedule contexts based on multi-dimensional coordinate context data, thereby enhancing the sharing rate of the first virtual transceiver or the second virtual transceiver among plural transmission paths.

Preferably, the several communication interfaces of the first communication module 10 and the several communication interfaces of the second communication module 20 form a static multi-path data transmission network in which they exchange resources and information in a manner that none of them is exclusively corresponding and connected to another. Preferably, the static multi-path data transmission network includes several static transmission paths. Each static transmission path can be configured flexibly. When data packets between at least two communication modules are under parallel transmission through multiple paths, every path can select its own data transmission protocol. For example, the paths may use different protocols or congestion control algorithms. Preferably, connections of the data transmission path network are established by the first communication module and the second communication module are a handshake manner. Every static multi-path data connection is constructed by a first communication interface and a second communication interface only. Additionally, every first communication interface establishes static multi-path data connections with several second communication interfaces, respectively, vice versa. Every second communication interface establishes static multi-path data connections with several first communication interfaces, respectively. The advantage of establishment of the static multi-path data transmission network is that every data packet can be sent to the destination in the most flexible manner at the fastest possible speed, without data delay due to path congestion. Preferably, the paths may be in various forms. For example, in the first communication module 10, the up-going TCP data coming from the application are segmented and packaged into messages, which are then distributed to paths. For example, the TCP connection having the longest life is regarded as a path. Every message has a small header, which contains information of the ID, the length, and the serial number of the connected application. Upon reception of a message, the second communication module extracts data to recombine the data packets, and forwards them to the second terminal based on the connection IDs. The down-link traffic is processed similarly but in the opposite direction. In the present invention, the control data (e.g., TCP SYN, FIN, and RST) are also packaged into control messages for achieving application connection management. The present invention uses the long-life TCP path for the advantage that overheads for establishing connections can be eliminated (e.g., slow startup), which gives direct benefit to short streams, particularly in a high-loss environment. In this way, the traffic in every path can be denser, thereby improving bandwidth usage.

Preferably, FIG. 9 shows an implementation mode for the first communication module 10 to receive data. Besides the first communication module 10, the first communication device also includes a network adapter 110, a first virtual network adapter 120 and a second virtual network adapter 140. The first communication module 10 can create the first virtual network adapter 120 and/or the second virtual network adapter 140 during operation. The first communication module 10 and the second virtual network adapter 140 constitute the processor 70. The network adapter 110 may be communicatively connected to the first virtual network adapter 120 and the second virtual network adapter 140 successively. The first virtual network adapter 120 does not operate within the processor 70, while the second virtual network adapter 140 operates within the processor 70. Configuration changes on the physical host are limited to sending user data to the processor 70 where the first communication module 10 is located and sending data from the first communication module 10 to the user, so as to minimize possible system configuration conflicts. When operating in the processor 70, potentially risky system configuration changes will not be performed on the physical host, thereby reducing potential security risks. Preferably, the communication module for sending the data outwards on the first communication device may be the network adapter 110 of entity type. The illustrated network adapter 110 may be or may include at least two sub-communication modules. Preferably, in the case where the second communication module 20 is also deployed on the second communication device, the first communication module 10 sniffs the original data information on the first communication device that was originally intended to pass through the established path of the first communication device and the second communication device. Preferably, the processing of specific data may include:

- S110, wherein the network adapter 110 transmits TCP data packets to the first virtual network adapter 120 and transmits non-TCP data packets to the kernel protocol stack 60.
- S120, wherein the first virtual network adapter 120 transmits the TCP data packet to the second virtual network adapter 130.
- S130, wherein the first communication module 10 captures TCP data packets on the second virtual network adapter 130; and/or
- S140, wherein the processor 70, according to configuration, discards TCP data packets after they have been read by the first communication module 10 and before they reach the kernel IP protocol stack. Therein, packet capture refers to reproducing but not transferring data packets. Thus, after packet capture, what the first communication module 10 acquires is copies of the TCP data packets. The original TCP data packets have to be discarded or they will undesirably enter the kernel IP protocol stack.

Preferably, the first communication module 10 transmits data packet through parallel multiple paths to the second communication module 20. A second scheduling module 25 functionally similar to the first scheduling module 15 performs relevance merging on the data packets received by the second communication module 20 according to preset data stream recombining rules so as to obtain the data. The second communication module 20 transmits the merged data to a second terminal 40 that is in data connection thereto through the communication interface. Specifically, the communication interfaces of the second communication module 20 receive data packets through multiple paths. The second scheduling module 25 performs relevance merging on the data packets received by the second communication module 20 according to preset data stream recombining rules, so as to regain the original data information transmitted by the first terminal 30. The second scheduling module 25 then transmits the restored original data information to the second terminal 40 through the communication interface.

Preferably, the first scheduling module 15 and the second scheduling module 25 of the present invention further conducts the scheduling behavior through opportunistic reinjection assessment, so as to match interface for every data packet, particularly the interface with the optimal connection, thereby maximizing the target function and providing all connections with the optimal services quality. The opportunistic reinjection is one of the best ways to use the remaining available bandwidth by means of multiple imbalanced paths. Preferably, opportunistic reinjection assessment is performed by:

$$\text{Max } N_{iface}^{-1}\Sigma_{i=1}^{N}Q_i(\tilde{u}_i+\beta c_i+v) \quad (1)$$

$$\text{s.t. } Q_i(Q_i-1)=0, \forall 1\leq i\leq N \quad (2)$$

where, $f=RTT^{-1}+\alpha\cdot BW$ represents interface quality. The RTT (round trip time) and the bandwidth (BW) are performance parameters acquired from the fusion result E. $\alpha$ is the factor of proportionality normalizing the RTT and the bandwidth to the same unit. $u_i=(1-L_i)f_i$ is the expected value of the interface utility program. $L_i$ represents the loss rate on the interface i, and $\mathcal{L}=\Pi_{i\in S}L_i$ represents the loss rate of data packets, where S is a set of selected interfaces.

$$c_i = \left(\frac{\mathcal{L}}{L_i} - \mathcal{L}\right)$$

may be represented as the contribution rate of the packet loss rate of the interface i. $\tilde{u}_i=u_i\cdot BW_i/buf_i$, where $buf_i$ is the size of all data packets in the TCP buffer area. $buf_i$ is calculated by subtracting the maximum output serial number of the captured data packets from the size of the injected data calculated from scheduling. $v=(1-\mathcal{L})F$, where F is the quantified importance of the no-loss requirement of a particular data packet, or the extra bandwidth costs the scheduling program is willing to pay. Qi represents whether the interface i is selected. $N_{iface}^{-1}\Sigma_{i=1}^{N}Q_i$ represents the number of interfaces assigned to this data packet. $\beta$ represents an adjustable linear coefficient, whose adjustment can make coefficient the packet loss rate more or less valued, thereby being adaptive to different network performance optimization requirements.

According to the opportunistic reinjection assessment of the present invention, if F=0, only the interface having the greatest $\tilde{u}_i$ is selected. When $\mathcal{L}$ F has its level equal to or higher than that of u, the scheduling program may select plural interfaces. Therefore, by setting F of the normal data packets as 0, and setting F of the reinjected data packet with a greater value, the scheduling behaviors for two data packets can be unified. Preferably, F allows flexible reinjection. With sufficient bandwidth, this helps prevent loss of sensitive messages or normal data packets having higher priority levels. The present invention uses the opportunistic reinjection assessment to perform scheduling for the following advantages. First, gain in multiplexing can be achieved through path diversity. Second, by executing opportunistic cross-stream retransmission, overheads caused by data packet loss and out-of-order delivery delay and itself can be reduced. Preferably, the opportunistic cross-stream retransmission refers to cross-path retransmission.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents.

What is claimed is:

1. A location-awareness-based network intermediate device, at least comprising:
a scheduling module (203), which is configured to fuse short-term historical data (602) about short-term and/or real-time network performance and location-awareness-based multi-day network performance data (601), so as to generate context data (600) for predicting network performance, and
acquire a deterministic connectivity mode in a mobile network environment based on the context data (600) so as to enhance performance of end-to-end transmission,
wherein the network intermediate device is to be deployed in a communication path between a plurality of clients (100) and a plurality of servers (400) so as to relay communication data between the clients (100) and the servers (400),
wherein the network intermediate device further comprises transceiver modules (201) and the scheduling module (203) is configured to, based on the context data (600), map data of the clients (100) or the servers (400) received by the transceiver modules (201) to at least two communication paths (500) accessed by the transceiver modules (201),
so as to realize multi-path transmission between the clients (100) and the servers (400),
wherein a first data relay processing module (200) establishes a multi-path connection with the plurality of clients (100) or servers (400) capable of the multi-path transmission or with a second data relay processing module (300) having communication sessions with the servers (400),
wherein the scheduling module (203) is configured to distribute the data received by the transceiver modules (201) to a first path (210) that processes the data while bypassing a kernel protocol stack (230) and to a second path (220) that processes the data through the kernel protocol stack (230), and map the data processed in the first path (210) to at least two mutually independent communication paths (500), thereby constructing a multi-user multi-path transmission framework at a level of a user space (240), and
wherein the scheduling module (203) is configured to: sense disconnections/connections of different standard networks based on an estimate of a network performance indicator; predict probabilities of switching results among the different standard networks based on the sensed disconnections/connections of the different standard networks; and generate risk switching results based on the predicted probabilities of the different switching results, wherein the switching results include Success, Failure, and Blackout.

2. The network intermediate device of claim 1, wherein the scheduling module (203) analyzes and classifies the received data using the transceiver modules (201), so as to distribute the data of an editable, specific type to the first path (210), wherein the scheduling module (203) classifies the received data through: determining whether a frame structure of the received data accords with a frame structure of the specific data type; and determining whether the received data are data directly connected to a target client (100) or a target server (400).

3. The network intermediate device of claim 1, wherein the scheduling module (203) is configured to acquire the risk switching results through: assigning different penalty values to wrong predictions about Success, Failure, and Blackout; develop a risk decision table based on the penalty values and the probabilities of predicting Success, Failure, or Blackout; and generate the risk switching results based on a minimal risk value obtained from the risk decision table.

4. The network intermediate device of claim 1, wherein when the risk switching results indicate that the connection of at least one said standard network is Failure and/or Blackout, the scheduling module (203) retransmits, across the communication paths (500), a copy of the data previously transmitted by the connection of the standard network, thereby reducing out-of-order delivery delay, and packet loss.

* * * * *